3,038,204
TIRE REPAIR DEVICE
Melvin W. Van Scoyk, Arvada, Colo., assignor to Winner Manufacturing & Sales Co., Arvada, Colo., a corporation of Colorado
Filed June 23, 1960, Ser. No. 38,344
2 Claims. (Cl. 18—18)

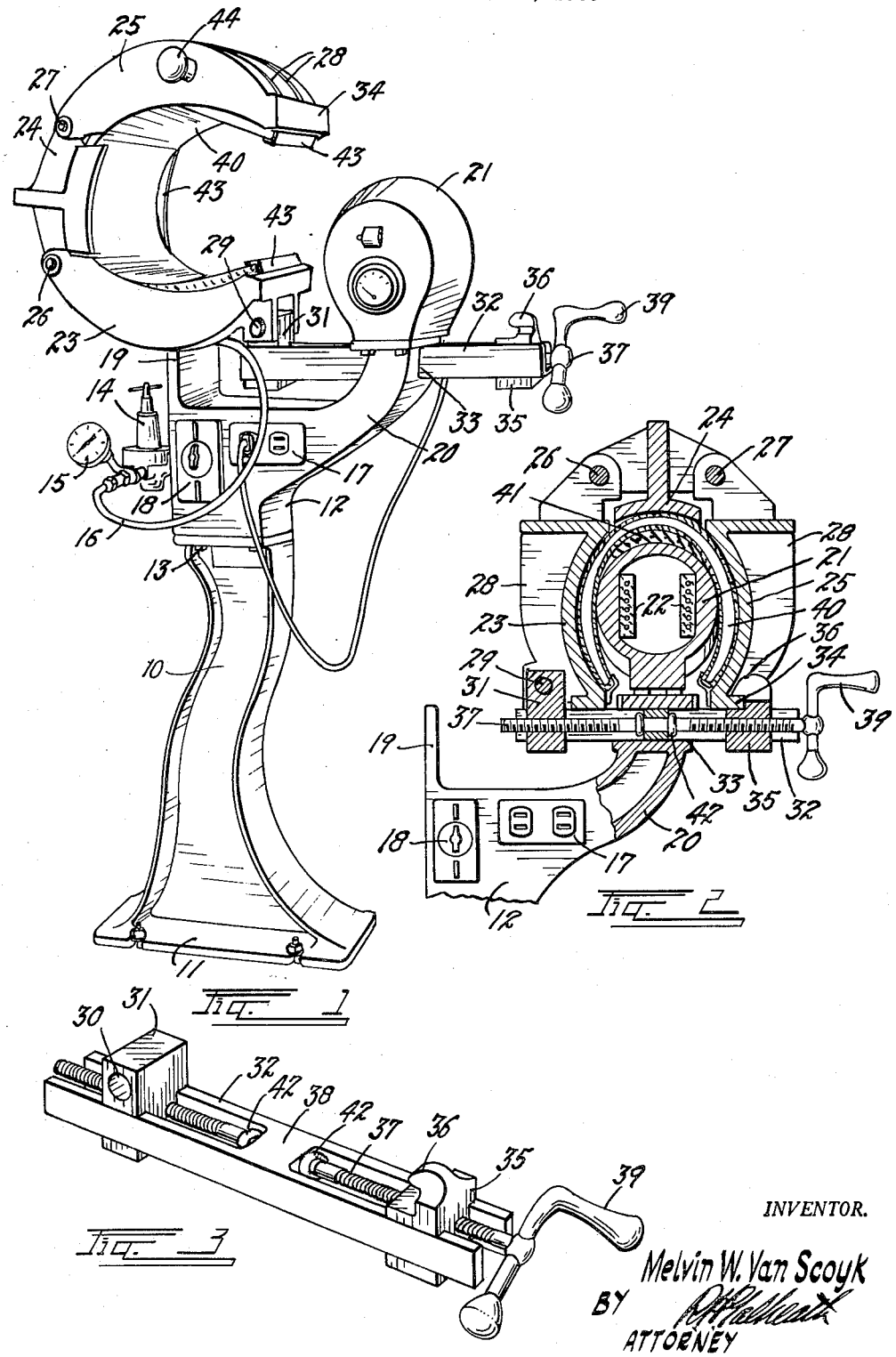

This invention relates to a tire casing repair device for making spot or sectional repairs in automotive vehicle tires and more particularly to the type of repair device in which the tire is suspended over an inner heated mandrel and surrounded by a confining pressure hood as described in applicant's copending application, Serial No. 787,407, now Patent No. 2,991,505.

The principal object of this invention is to provide a highly efficient, flexible pressure hood structure for repair devices of this type which will support the hood completely out of the way to allow the tire to be quickly, easily and accurately positioned on the inner mandrel without interference from the hood and to provide means whereby the hood will be quickly and easily swung into position about the section of the tire to be repaired and locked in place thereabout with a minimum expenditure of time and effort.

A further object of the invention is to provide a flexible, sectional pressure hood for a tire vulcanizing device which will be free to move transversally of the tire as it is clamped in place thereabout so as to automatically adjust itself to provide uniform lateral pressure against the tire.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawing:

FIG. 1 is a perspective view of the improved sectional tire repair device as it would appear in the open position ready to receive a tire to be repaired;

FIG. 2 is a fragmentary cross sectional view through an internal tire mandrel and pressure hood as used upon this device illustrating it in the closed position; and FIG. 3 is a detail perspective view of a hood clamp slide bar as employed in this improved tire repair device.

This improved tire repair device is mounted upon an ornamental supporting standard 10 arising from a base 11 adapted to be secured to the floor. A head casting 12 is fixedly mounted on the upper extremity of the standard 10 in any desired manner, such as by means of suitable cap screws 13. The head casting 12 carries the usual tire repair stand accessories, such as pneumatic pressure reducer 14, pressure gauge 15, air bag tube 16, electric outlets 17 for heat boosters, mandrels, etc., time switch 18, etc. The head casting 12 is formed with an upstanding hood rest 19 at one side thereof and a hollow curvated bracket arm 20 extending outwardly and upwardly at the other side thereof to support a hollow, horizontal curvated, internal mandrel 21 over which the tire casing to be repaired is suspended. The mandrel 21 is provided with the usual heating elements 22 for imparting a curing temperature thereto.

The casing to be repaired is clamped in place about the internal mandrel 21 through the medium of a three member pressure hood consisting of an inside, curvated cheek member 23, a medially-positioned tread member 24, and an outside, curvated cheek member 25. The entire inner surface of the pressure hood is lined with an inflatable air bag 40 to which the air tube 16 is connected. The inside cheek member 23 is hingedly connected to the tread member 24 through the medium of suitable hinge pins 26 and the outside, cheek member 25 is similarly hingedly connected to the tread member 24 through the medium of suitable hinge pins 27. The cheek members 23 and 25 are preferably reinforced by means of suitable reinforcing ribs 28.

The cheek member 23 is pivotally mounted on a pivot pin 29 passing through a pivot passage 30 in a pivot nut 31. The pivot nut 31 is slidably mounted in the inner portion of a bifurcated track bar 32 which extends horizontally through a guide opening 33 in the arm 20 below the mandrel 21.

The reinforcing ribs 28 of the outside cheek member 25 terminate at ther lower extremities in a horizontally-extending terminal flange 34 arranged to rest upon the outer extremity of the track bar 32. A latch nut 35 is slidably mounted in the outer portion of the track bar 32. The latch nut 35 is provided with a latching hook 36 positioned to engage the flange 34 when the latch nut 35 is moved inwardly.

The nuts 31 and 35 are caused to move toward or away from each other through the medium of a rotatable vise screw 37 rotatably mounted in a solid medial portion 38 of the track bar 32 between suitable spacing collars 42 so that it may be freely rotated in either desired direction by means of a suitable hand crank 39. The vise screw 37 is threaded through the two nuts 31 and 35, the threads in the nut 31 being of opposite hand from the threads passing through the latch nut 35. Thus, rotation of the crank 39 in one direction will cause the two nuts to separate from each other and rotation in the opposite direction will cause the two nuts to approach each other.

It is believed that the purpose of the above described construction will be apparent to one skilled in the art from the above description. Briefly, when not in use, the pressure hood is normally supported completely away from the mandrel 21 on the hood rest 19, as shown in FIG. 1. The vehicle tire casing to be cured is hung over the mandrel 21 with the repair section of the tire positioned on the mandrel. A conventional electrical heat booster pad 41 is then placed over the repair and the pressure hood is pulled forwardly and downwardly, rotating about the axis of the pivot pin 29 until it rests upon the track bar 32. The hand crank 39 is then rotated to cause the nuts 31 and 35 to approach each other so as to swing two cheek members 23 and 25 inwardly against the sides of the suspended tire casing. Air is then introduced into the air bag 40 and the electric current is introduced into the heating elements 22 and the heat booster to effect the desired vulcanization or cure of the repair.

At the termination of the proper curing time, the air is discharged from the air bag and the crank 39 is reversely rotated to cause the nuts 31 and 35 to move away from each other to release the repaired casing. The pressure hood is now swung upwardly and rearwardly to its "at rest" position on the hood rest 19. The repaired casing can now be simply lifted from the mandrel 21.

Attention is called to the fact that since the track bar 32 is free to slide horizontally in the arm 20, it automatically adjusts itself to the position of the tire casing as the two nuts approach each other so as to provide uniform pressure at both sides of the casing.

While a specific form of the improvement has been described and illustrated herein, it is to be understood that the same may be varied within the scope of the appended claims, without departing from the spirit of the invention.

Having thus described the invention what is claimed and desired secured by Letters Patent is:

1. A tire repair device comprising: a mandrel supporting member; an inner tire mandrel shaped to conform to the interior of a section of a vehicle tire supported in a substantially horizontal position by and above said mandrel supporting member so that a pneumatic vehicle tire may be hung thereover and suspended therefrom; a track bar extending through and being freely and slidably mounted in said supporting member below and at right angles to the axis of said mandrel; a pivot nut slidably mounted on said track bar at one side of said supporting member; a latch nut slidably mounted on said track bar at the other side of said supporting member; an arcuate inside cheek member hingedly mounted on said pivot nut; an arcuate tread member hingedly mounted on said inside cheek member; and an arcuate outside cheek member hingedly mounted on said tread member; said cheek members and said tread member forming a three-piece articulated pressure hood which can be swung about the axis of a hinged mounting between said pivot nut and said inside cheek member to a position over and about said mandrel to enclose a tire suspended thereon; a latching hook on said latch nut adapted to detachably engage said outside cheek member; and a double-threaded jackscrew mounted on said track bar and threaded into both said nuts so as to draw the latter simultaneously toward each other to clamp said cheek members against the sides of said tire.

2. A tire repair device as described in claim 1 in which said three-piece hood can be swung about the axis of the hinged mounting between said pivot nut and said inside cheek member from a vertical position over said mandrel to a horizontal position at one side thereof and having a hood rest mounted on said supporting member for supporting said hood in its horizontal position.

References Cited in the file of this patent

UNITED STATES PATENTS

| | | |
|---|---|---|
| 2,024,279 | Ebenhack | Dec. 17, 1935 |
| 2,406,498 | James | Aug. 27, 1946 |
| 2,421,100 | Lakso | May 27, 1947 |
| 2,904,842 | Alm | Sept. 22, 1959 |

FOREIGN PATENTS

| | | |
|---|---|---|
| 15,248 | Australia | Aug. 23, 1928 |